(12) United States Patent
Weller et al.

(10) Patent No.: US 9,614,423 B2
(45) Date of Patent: Apr. 4, 2017

(54) METHOD FOR PRODUCING ROTATING ELECTRICAL MACHINES

(71) Applicants: Traugott Weller, Auerbach (DE); Susanne Weller, Auerbach (DE)

(72) Inventors: Traugott Weller, Auerbach (DE); Susanne Weller, Auerbach (DE)

(*) Notice: Subject to any disclaimer, the term of this patent is extended or adjusted under 35 U.S.C. 154(b) by 149 days.

(21) Appl. No.: 14/391,160

(22) PCT Filed: Dec. 21, 2012

(86) PCT No.: PCT/EP2012/076737
§ 371 (c)(1),
(2) Date: Oct. 7, 2014

(87) PCT Pub. No.: WO2013/149688
PCT Pub. Date: Oct. 10, 2013

(65) Prior Publication Data
US 2015/0048710 A1 Feb. 19, 2015

(30) Foreign Application Priority Data
Apr. 7, 2012 (DE) .......................... 10 2012 007 232

(51) Int. Cl.
*H02K 15/04* (2006.01)
*H02K 3/04* (2006.01)
(Continued)

(52) U.S. Cl.
CPC .......... *H02K 15/0435* (2013.01); *H02K 3/04* (2013.01); *H02K 3/47* (2013.01); *H02K 15/08* (2013.01);
(Continued)

(58) Field of Classification Search
CPC .... H02K 15/0435; H02K 15/08; H02K 15/09; H02K 15/095; H02K 3/04;
(Continued)

(56) References Cited

U.S. PATENT DOCUMENTS 4,131,988 A * 1/1979 Finegold .............. H02K 15/095
140/92.2
4,236,295 A 12/1980 Nakamura ...................... 29/598
(Continued)

FOREIGN PATENT DOCUMENTS

AT 344267 7/1978 ............... H04R 9/04
CA 1045796 1/1979 ............ H01F 41/04
(Continued)

OTHER PUBLICATIONS

International Search Report and Written Opinion issued in corresponding application No. PCT/EP2012/076737, dated Apr. 2, 2014 (11 pgs).
(Continued)

*Primary Examiner* — A. Dexter Tugbang
(74) *Attorney, Agent, or Firm* — Hayes Soloway P.C.

(57) ABSTRACT

A method for producing rotating electrical machines having a motor coil produced in a cantilevered manner for motors or generators, wherein the coil already surrounds the inner part during the manufacturing process, i.e. is pre-assembled, and this is also used as an aid for coil shaping during the production of the coil, includes a first step, in which the motor coil is wound in a stepwide process between two end faces over the magnetic inner part and completely surrounds the inner part, a second step, in which the shaping of the motor coil is carried out by pressing the winding wires by moving the shaft with the surface of the inner part against the inner side of the motor coil, in particular by eccentrically rolling off of the latter and pressing it against an abutment, and a third step, in which the pressed motor coil is baked by way of applying heat. Also provided is a rotating electrical machine.

17 Claims, 5 Drawing Sheets

(51) Int. Cl.
*H02K 15/095* (2006.01)
*H02K 15/09* (2006.01)
*H02K 3/47* (2006.01)
*H02K 15/08* (2006.01)

(52) U.S. Cl.
CPC ........... *H02K 15/09* (2013.01); *H02K 15/095* (2013.01); *Y10T 29/49009* (2015.01); *Y10T 29/49012* (2015.01); *Y10T 29/49071* (2015.01); *Y10T 29/49073* (2015.01)

(58) Field of Classification Search
CPC ................ H02K 3/47; Y10T 29/49009; Y10T 29/49012; Y10T 29/49071; Y10T 29/49073
See application file for complete search history.

(56) References Cited

U.S. PATENT DOCUMENTS

| | | | | |
|---|---|---|---|---|
| 5,239,742 | A * | 8/1993 | Kobayashi | H02K 15/095 264/272.2 |
| 5,463,806 | A * | 11/1995 | Sacotte | Y10T 29/49073 29/605 |
| 5,715,590 | A | 2/1998 | Fougere et al. | 29/564.1 |
| 7,821,173 | B2 | 10/2010 | Bertolini et al. | 310/216.002 |
| 2005/0057113 | A1 * | 3/2005 | Du | H02K 15/0435 310/216.091 |
| 2013/0134809 | A1 | 5/2013 | Phillips et al. | 310/71 |

FOREIGN PATENT DOCUMENTS

| | | | | |
|---|---|---|---|---|
| DE | 2821740 | | 11/1978 | ............. H02K 15/04 |
| DE | 69407908 | | 9/1998 | ............. H02K 15/02 |
| DE | 10137201 | | 2/2003 | ............... H02K 1/06 |
| DE | 102004034611 | | 2/2006 | ............. H02K 15/04 |
| DE | 202006007619 | | 10/2007 | ................ H01F 5/00 |
| EP | 1508954 | | 2/2005 | ........... H02K 15/095 |
| EP | 2597757 | | 5/2013 | ............... H02K 3/47 |
| GB | 954623 | | 4/1964 | |
| GB | 1514458 | | 6/1978 | ............. H04R 31/00 |
| JP | 50-67906 | | 6/1975 | ............. H02K 23/56 |
| JP | 57-022356 | | 2/1982 | ............. H02K 15/04 |
| JP | 57-206251 | | 12/1982 | ............. H02K 15/04 |
| JP | 09-149608 | | 6/1997 | ............. H02K 15/04 |
| JP | 2008259371 | A * | 10/2008 | |
| SU | 1233246 | | 5/1986 | ............. H02K 15/06 |
| SU | 1304133 | | 4/1987 | ............. H02K 15/04 |

OTHER PUBLICATIONS

International Preliminary Report on Patentability issued in corresponding PCT Patent Appln. No. PCT/EP2012/076737 dated Oct. 7, 2014, English translation (10 pgs).

Notice of Reasons for Rejection issued in corresponding Japanese Patent Appln. No. 2015-503773 dated Jan. 26, 2016, with English translation (12 pgs).

Notification of the First Office Action issued in corresponding Chinese Patent Appln. No. 201280072196.4 dated Mar. 2, 2016, with English translation (16 pgs).

German Office Action issued in related application No. 10 2012 007 232.5, dated Oct. 25, 2012 (4 pgs).

Russian Office Action issued in application No. 2014144487/07(071789) dated Jun. 1, 2016 (9 pgs).

* cited by examiner

METHOD FOR PRODUCING ROTATING ELECTRICAL MACHINES

BACKGROUND OF THE INVENTION

The invention relates to a method for producing a rotating electrical machine having an ironless coil, in the form of motors or generators having air gaps, in which the coil extends.

Such motors are referred to as air coil motors and have a high efficiency.

From the prior art various designs are known, on the one hand motors having bell-shaped coils and on the other hand motors wherein the armature coil completely surrounds the rotor. Within the armature coils, a freely rotatable permanent magnet is provided on a shaft, with the armature coil and the permanent magnet being coaxially supported.

From DE 20 2006 007 619 U1, a bell-shaped armature coil consisting of a hollow cylindrical coil wound using a winding wire is known, in the gap opening of which a coil carrier plate is single-endedly inserted. The bell-shaped armature coil forms the active part of the rotor and is formed as a self-supporting cylindrical coil having a helical winding.

Various methods are known for winding the bell-shaped armature coils.

One method provides for the winding of the coil to be carried out onto a sleeve or a mandrel. Winding is carried out successively in various layers, wherein after each layer, the wire is fixed by way of heating (intermediate baking). This is followed by winding the next layer, until the coil is finished. The final shaping process is carried out by way of the so-called finish baking. A further method consists in carrying out the entire winding process onto a sleeve or a mandrel, on the circumference of which distributed fine pins are provided at both ends, which pins fix the coil during the winding process. Winding is carried out continuously without intermediate baking. Subsequently, the pins are removed, the coil is withdrawn and the coil is finish-baked. A so-called self-bonding wire is used as a winding wire. Preferably, winding is carried out as a helical winding, which is easy to realise and has good self-supporting properties.

From DE 28 21 740 B2, a method for producing a bell coil is known, in which the coil is compacted after winding. To this end, an expanding mandrel or a pressure pad is used which acts outwardly in the radial direction onto the coil and presses the latter against an outer mould.

Disadvantages of these coils are on the one hand the relatively great ineffective conductor portion within each coil and on the other hand the skew extension of the conductor relative to the direction of movement.

A further disadvantage is that the effective conductor can be increased only by way of an axial extension of the machine. This will always have significant technical limitations, so that due to the high centrifugal forces in connection with the single-sided support of the coil, only relatively short bell-shaped armatures can be used.

From DE 101 37201 A1, an air gap coil with a bell shape within an electrical machine is known. This type of coil is an air gap coil with conductors that extend at least partially at an angle or in an arc shape relative to the direction of movement. The constructive form consists in the fact that the conductors are bent or folded in a targeted manner within a rotating machine in a cross-sectional view transversely to the direction of movement, and the coil approaches the axis or shaft in the axial direction at least on one side. The favourable geometric effects are then achieved as a result of the constructive form of the bending or folding as the coil approaches the axis, and by way of a targeted deformation of the conventional coil channel within the bent or folded shape of the coil.

From GB 95 46 23 A, a small direct current motor is further known, wherein the magnetic exciter field is generated by a permanent magnet provided within the armature, which is freely rotatable and is coaxially supported with the latter. The motor may for example consist of a coil support made from a tubular jacket having two front-side discs or two spaced-apart support discs, between which the coil itself is provided in a cantilevered manner. The coil is mounted on the winding support. The core magnet is rotatably supported inside the coil by way of a bearing on the rotor shaft. What is of disadvantage here, in the case of the cantilevered embodiment of the coil, is the relatively large air gap provided to prevent the coil from brushing against the core magnet or against the housing jacket.

From DE 694 07 908 T2, a method for producing a coil for an electric motor is known, wherein a winding wire is wound onto a support mandrel or alternatively onto a later rotor and is immediately fixed after winding. The windings can be pressed outwards in the radial direction in order to enhance the packing density. The pressing operation can be carried out in the magnet interference sleeve of the motor or prior to inserting it into the magnet interference sleeve in a separate device.

Proceeding from the prior art, it is the object of the invention to provide a method for producing rotating electrical machines having a cantilevered coil for motors or generators. This coil can act both as a rotor for an ironless air coil armature and as a stator fixed to an iron packet for generating an electric rotary field, and it should also be simple to produce from a technical point of view.

SUMMARY OF THE INVENTION

According to the invention, this object is achieved by means of a method for producing a cantilevered motor coil for motors or generators as well as an electrical machine. Generally speaking, a motor coil is wound around the cylindrical inner part in such a way that it completely surrounds the latter. The cylindrical inner part is used to compact the motor coil starting from the inside, so that after the winding of the motor coil surrounding the inner part, a precise air gap for a free rotary movement of this coil or of the inner part described is obtained. This may be carried out in particular using the following steps: to start with, the individual segments of the coil are wound between two end plates over the inner part located on a shaft, and upon completion of the winding, this inner part will ultimately be surrounded by the finished motor coil. Subsequently, a step of shaping the motor coil by serially compressing the winding wires with the eccentric rolling off of the inner part on the inner side of the coil against an externally attached circular abutment is carried out which, either made from tube segments or as a whole cylinder, shapes the outside of the coil by means of the introduced counterforce. Finally, the motor coil is baked by introducing heat into the coil, so that it keeps its shape as a cantilevered motor coil.

Alternatively, the shaping step may be combined with the step for winding the motor coil. In this case, the following procedure results: winding the armature coil stepwise between two end plates over the inner part located on a shaft, so that the inner shaft is completely surrounded by the motor winding, and compressing the winding wires through the surface of the inner part against an abutment, with the surface of the inner part eccentrically rolling off on the inner side of the motor coil and pressing the latter against an abutment during the winding process; subsequently, baking of the motor coil by applying heat.

Further, there is alternatively the possibility of combining all the working steps into one step, so that during the winding process at the same time pressing and baking of the windings are carried out.

Conversely, the eccentric rolling-off movement for compressing the coil can also be introduced from the abutment onto an axially stationary inner part.

In order to improve the result of the shaping of the motor coil, the abutment may be excited using mechanical vibration. Thus, the mass inertia is used for compressing and the supplied necessary press-on force is reduced via the shaft.

The motor coil is preferably wound from a self-bonding wire, as a result of which mechanical fixing during or after the winding process becomes possible. It is further proposed to pre-wind the winding wire in the last phase of the wire infeed, i.e. during the winding of the last windings of the motor coil, into a square shape. In this form, i.e. flattened on all sides, the stability of the winding wire in the winding layer is improved and the efficiency of the machine will be substantially improved as a result of the higher copper filling.

The inner part on the shaft may carry both permanent magnets and a short-circuit or exciter winding and the inner part has the form of a cylinder with a smooth jacket surface, so as to ensure that the insulation of the winding wire is not damaged during shaping.

The motor coil may optionally act as a stator (mechanically connected to the outer magnetic part) or as a rotor (electrically connected via slip rings or a commutator). The number of pole pairs of the motor coil and the phases for controlling the machine are freely selectable. The advantages of the method according to the invention lie in the fact that the production of the motor coil is carried out directly on the inner part located on the shaft using wall panels, which at the same time forms the winding body. As a result of the straight wire section in the vertical part of the coil as well as the simple run in the turning part, a simple and quick winding technique may be used. No intermediate positions with deflection guides are necessary.

The motor coil is produced with the individual windings in a fixed succession, but closed. The individual operations of shaping, compressing and assembling coil segments are eliminated.

Since the inner part serving as the winding body is accessible from all sides, simple, frame-like winding shapes become possible, which compared to the bell armature result in a substantially improved overall efficiency of the machines.

As a result of the shaping process, manufacturing tolerances are compensated and in this way the required air gap is minimised. As a result, the achievable power density is increased.

A rotating electrical machine according to the invention, which may be produced using the method according to the invention, is characterised in that it includes a magnetic inner part and a motor coil consisting of at least one winding, which extends along the cylindrical outer surface of the inner part, via one of the front sides of the inner part, back along the outer surface of the inner part and over the other front side of the inner part, whilst an air gap is present between the inside of the motor coil and the outer surface of the inner part, and wherein the coil is mechanically compacted at least in the section adjacent to the inner side. The mechanically compacted area is characterised in that the cross section of the material of the motor coil, in particular a copper conductor, that is available per surface unit is higher than in the non-compacted areas on the radially outer side of the motor coil.

Preferably, the wire sections located on the inside of the motor coil are flattened on the side facing the central axis of the inner part. The flattening results from the rolling effect of the inner part that generates the air gap between the motor coil and the inner part.

It is preferably provided for the coil to extend in the area of the outer surface of the inner part parallel to the central axis of the inner part. This results in a high efficiency of the electrical machine, because a large portion of the length of the conductors that form the motor coil extends perpendicularly to the direction of movement through the centre of the magnetic field. This is a substantial advantage for example compared to a bell-shaped coil, in which the conductors of the motor coil predominantly extend helically over the magnetic field.

DESCRIPTION OF THE DRAWINGS

The invention will be described in more detail by means of an embodiment example, wherein.

DETAILED DESCRIPTION OF THE INVENTION

The production of a rotating electrical machine having an ironless cantilevered armature coil will be described in an embodiment example using a three-step process.

Figure 1:
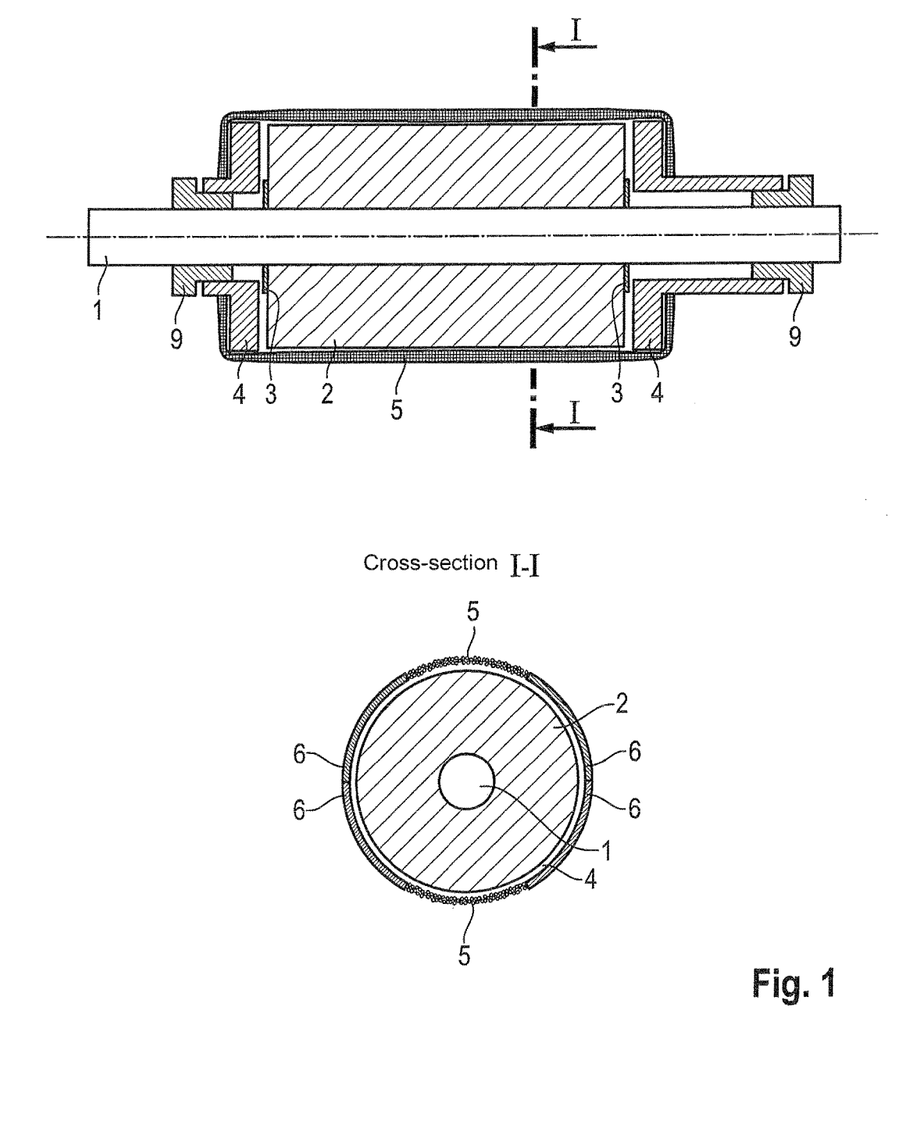
FIG. 1 shows a schematic longitudinal and transverse cross section of an inner part of the electrical machine, wherein the motor coil surrounds the inner part.

FIG. 1 shows a schematic diagram of a motor and armature coil 5 upon completion of the winding process. Prior to winding the armature 5, a distance plate 3 and an end plate 4 are pushed onto a shaft 1 on both sides with an inner part 2 that consists for example of a cylindrical permanent magnet. Subsequently, the end plates 4 are centred on the shaft 1 by means of a bushing 9. The unit thus prepared is inserted into a winding unit and a plurality of spacers 6 is inserted for the winding process. Winding of the armature is carried out in a first manufacturing step, thereafter stepwise between the end plates 4 via the inner part 2, and ultimately surrounds the latter completely. A so-called self-bonding wire is used as a winding wire which, for the production of the last phase of the winding, is initially pre-wound into a square shape by means of a mechanism. This ensures that the last windings of the corresponding coil, i.e. the outer windings, will be closer together because the individual wires can be lying closer together without any gaps (in an ideal case) if they have a square cross section, rather than ending up with a clearance between the individual wires, as this is the case with a circular wire cross-section.

In principle it would also be conceivable to use the wire used for the motor coil during the entire winding process with a square cross section.

As a result of the free winding over the supports of the motor coil, a thickening will by necessity appear in the centre, which does not allow an air gap and blocks the required freedom of the rotor. This deficiency is remedied by the subsequent formatting of the coil.

Figure 2:
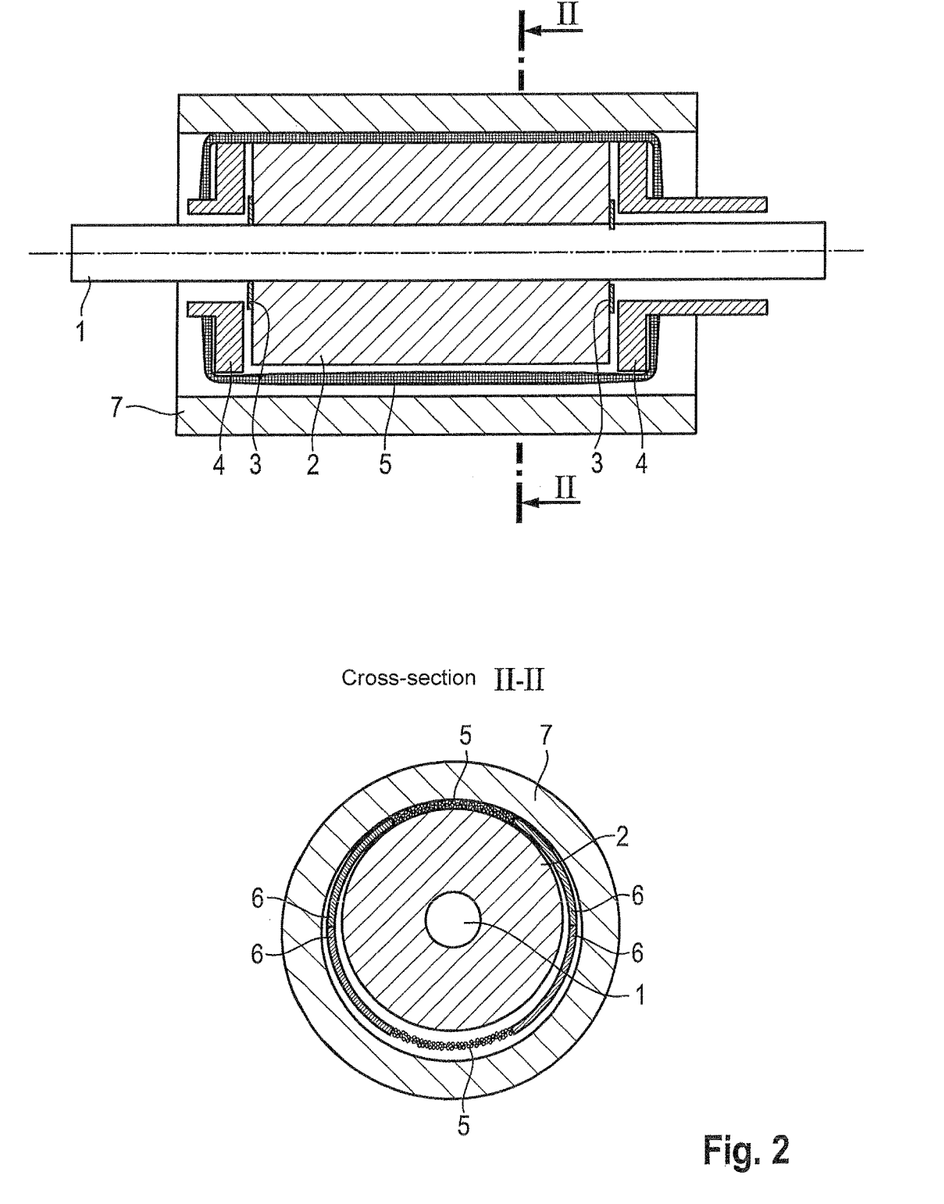
FIG. 2 shows a schematic longitudinal and transverse cross section of the shaping process.

After the winding process, the bushings 9, which hold the end plates 4 centrically relative to the shaft 1, are removed and an abutment 7 is pushed on (FIG. 2). The unit is inserted into a device and the shaft 1 with the inner part 2 is set into an eccentric motion. As a result, the inner part 2 rolls off eccentrically on the inner side of the armature winding 5 and compacts the winding in a uniform manner against the abutment 7 and shapes the armature winding 5 (second manufacturing step). In FIG. 2, the armature winding is shown in a condition in which the windings have already been compacted by the rolling effect of the inner part 2 to such a degree that a clearance is formed between the outer surface of the inner part 2 and the inner surface of the armature winding 5. This clearance can be easily seen in the sectional views of FIG. 2 respectively below the inner part 2.

Heat is applied to the armature winding 5 both before and during the rolling/compacting.

After the shaping process, the abutment 7 is removed and heat is applied to the compressed armature winding 5, as a result of which the individual wires of the winding are baked together (third manufacturing step). The application of heat onto the armature winding 5 can be carried out by passing a suitably strong current through the armature winding. However, in principle it is also possible to supply the required energy from the outside in a different way, for example by radiation or by hot air.

Figure 3:
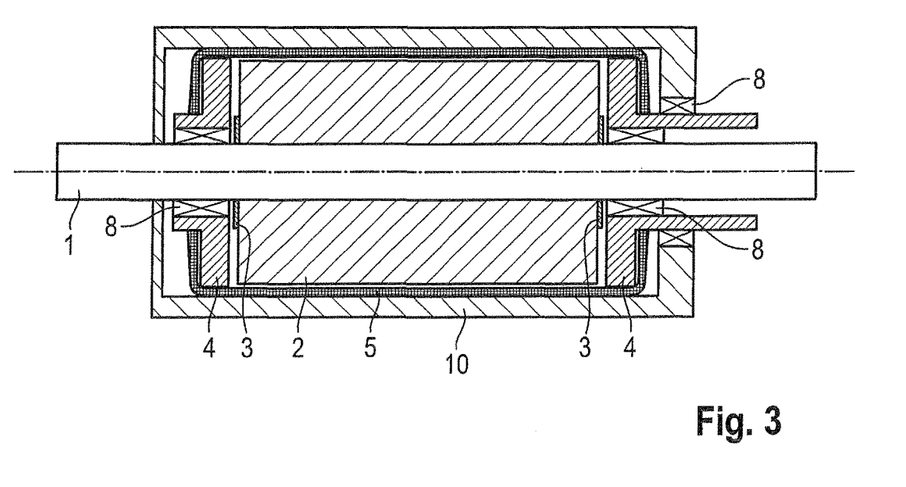
FIG. 3 shows a schematic longitudinal and transverse section of the finished electrical machine.

Subsequently, bearings 8 are inserted into the end plates 4 and fix the armature winding 5 in respect of the shaft 1 (FIG. 3). As a result, a minimised air gap is created between the cylindrical surface of the inner part 2 and the inner side of the armature winding 5. Subsequently, the armature winding 5 is provided with electric connections in the usual manner and is inserted into the housing 10 together with the shaft 1 and with the inner part 2, in the course of which one of the end plates 4 of the armature winding is rotationally supported in the housing 10 by means of a bearing 8, so that the mechanical power of the armature is transmitted towards the outside.

If the armature winding 5 is arranged to be stationary and the mechanical power is picked up by the shaft 1, the bearing 8, in relation to FIG. 3, is located on the left-hand side of the housing 10 in order to support the shaft 1 in the housing 10.

Some details of the electrical machine according to the invention and of the method for the production thereof will be explained below by means of FIGS. 4 to 7 in a 4-pole brushless embodiment with an inner pole.

Figure 4:
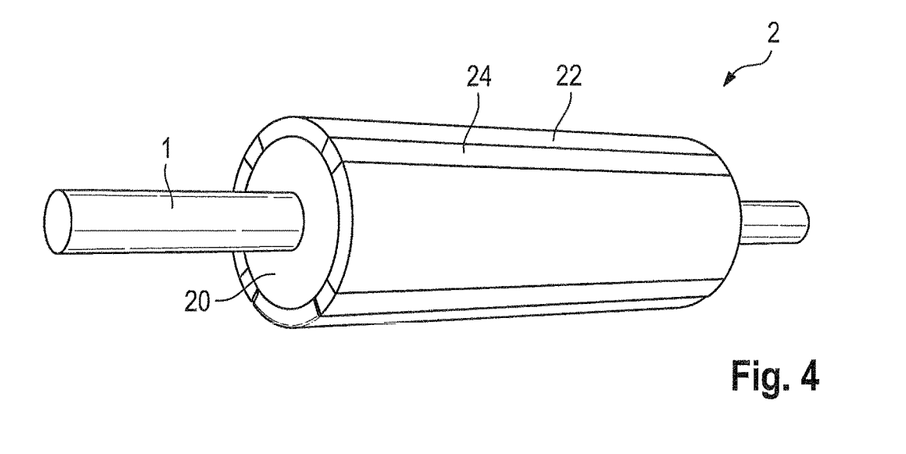
FIG. 4 shows a schematic perspective view of an inner part of the electrical machine according to the invention.

In FIG. 4, the cylindrical inner part 2 is shown, which has a magnetically conductive core 20, a plurality of magnets 22 and filling elements 24 provided in the circumferential direction between the magnets 22. Shaft 1, which is known from FIGS. 1 to 3, is connected in a rotationally fixed manner to a magnetically conductive core 20. The essential feature of the inner part 2 is that it has a cylindrical, substantially smooth circumferential surface.

Figure 5:
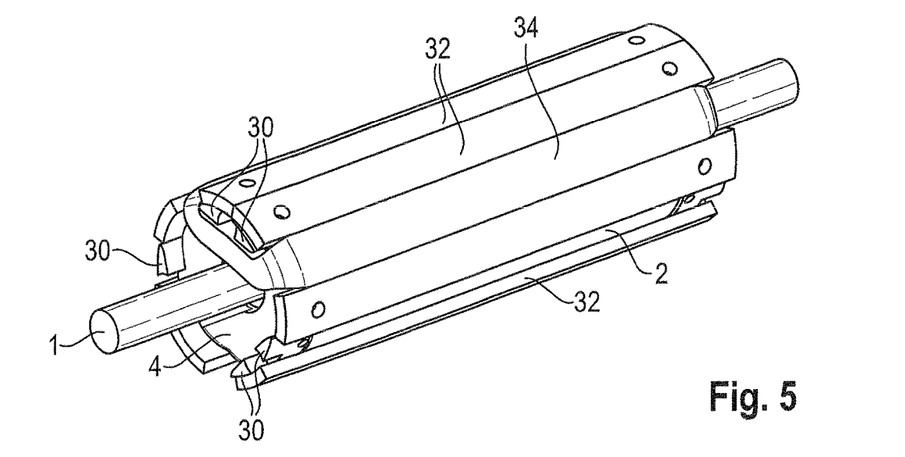
FIG. 5 shows a schematic perspective view of the inner part of FIG. 4 in a first intermediate condition during the production of the motor coil.

In FIG. 5, a first intermediate condition during the winding of the motor coil 5 is shown. What can be seen are the end plates 4 which have been pushed onto both sides of the shaft 1, until they are allocated at a slight distance from the two front sides of the inner part 2. In order to ensure the concentric orientation of the end plates 4 relative to the inner part 2, the bushings 9 known from FIG. 1 may be used, which are not shown in FIG. 5. Since centring is not absolutely necessary, it is also conceivable to wind the motor coils 5 without using the bushings 9. It can be seen that the diameter of the end plates 4 is slightly larger than the diameter of the inner part 2.

In FIG. 5, a plurality of winding aids 30 can be seen, which are implemented as projections on the end plates 4. In the embodiment shown, the winding aids are implemented integrally with the end plates and extend parallel to the shaft 1 away from the inner part 2. They are used to guide the winding in the desired manner via the front sides of the end plates 4. On the outer circumference of the end plates 4, also various spacers 32 may be fixed by way of bores and pins, which spacers ensure that the windings extend precisely in a segment provided for them. In FIG. 5, a winding 34 is shown that is implemented between two adjacent spacers 32 and extends in a section extending along the outer circumferential surface of the inner part 2 parallel to the central axis of the inner part. Therefore, each winding has a "toward section" that extends along the outer surface of the inner part, a first deflected section that extends over the front side of one of the end plates 4 within the winding aids 30, a "return section" that also extends along the outer surface of the inner part 2, and a second deflected section that extends over the front side of the other end plate. This means that each winding 34 extends over all the outer surfaces (cylindrical circumferential surface and two front sides) of the inner part.

Figure 6:
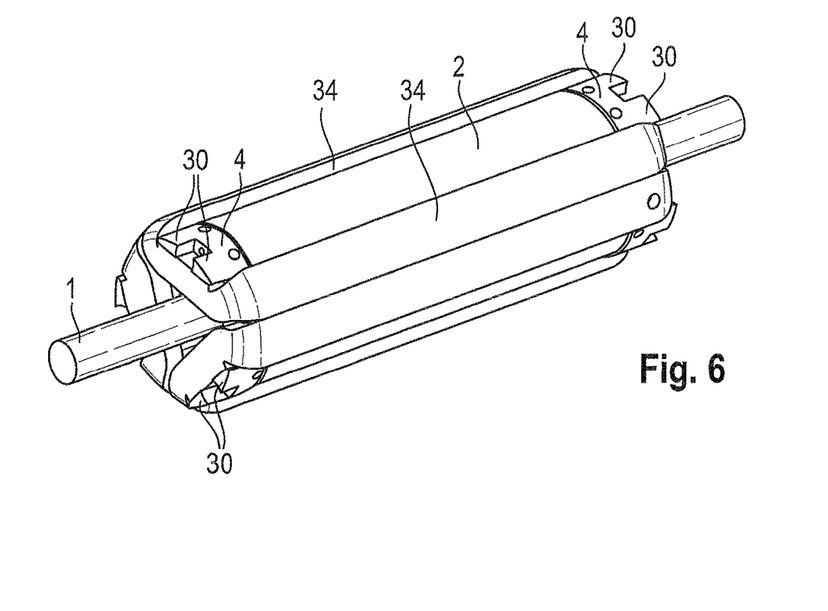
FIG. 6 shows a schematic perspective view of the inner part of FIG. 4 in a second intermediate condition during the production of the motor coil.

In FIG. 6, the inner part with three finished windings 34, the so-called internal windings, can be seen. These are here windings, the deflected sections of which directly rest on the front sides of the end plates 4, within the winding aids 30, and do not intersect with any other windings.

Once the internal windings have been finished, two further end plates 4A are attached, which in turn are provided with winding aids 31 in the form of integrally attached projections.

Figure 7:
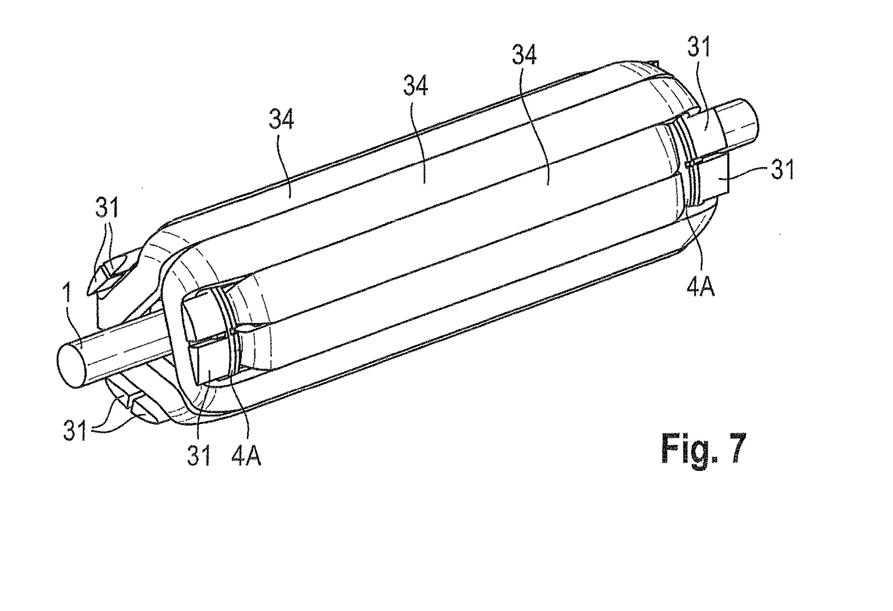
FIG. 7 shows a schematic perspective view of the inner part with the motor coil surrounding the latter.

In FIG. 7, the inner part with the finished windings is shown. Compared to the condition shown in FIG. 6, also the outer sub-windings have been finished, so that altogether six windings have been formed, which are directly adjacent to each other. The individual connections of the windings have not been shown here for the sake of greater clarity. Of the inner part, only the shaft 1 can be seen, because the windings completely surround the inner part.

In the condition shown in FIG. 7, the inner layers of the individual windings do not extend at a constant distance from the central axis of the inner part 2, but extend in a slightly arc-shaped manner. In the region of the end plates 4, their distance from the central axis corresponds to the radius that is predetermined by the dimensions of the end plates 4. Midway between the end plates (and also in a not precisely defined region either side of the centre), however, the individual wires rest on the cylindrical outer surface of the inner part 2. Therefore, it is hardly possible to turn the inner part 2 within the windings immediately after the winding of the coil. The air gap required for the free movability of the inner part 2 between the outer surface of the inner part 2 and the windings is not generated until the windings are outwardly compressed in the radial direction. To this end, the inner part 2 is used as a tool that exerts an outward force in the radial direction onto the windings, which in turn are supported on the inner surface of the abutment 7 (see FIG. 2). The force acting outwards in the radial direction can be applied due to the fact that the inner part 2 rolls off on the inner side of the windings forming the motor coil 5. Alternatively, it is also conceivable for the inner part 2 to carry out an oscillating movement within the windings and for the direction of this oscillating movement to be changed, so that all of the inner circumferential sections of the windings are compacted one after the other. In the final condition, the inner layers of the individual windings will then be pushed back outwards to such a degree that the inner diameter within the windings corresponds approximately to the outer diameter of the end plates 4. In this way, a substantially constant air gap between the motor coil 4 and the inner part 2 is ensured.

The invention claimed is:

1. A method for producing rotating electrical machines having a motor coil produced in a cantilevered manner for motors or generators, wherein the motor coil already surrounds a magnetic inner part during the manufacturing process, and this is also used as an aid for coil shaping during the production of the motor coil, comprising:
a first step, in which the motor coil is wound in a stepwide process between two end faces over the magnetic inner part and completely surrounds the magnetic inner part, and
a second step, combined with the first step, in which shaping of the motor coil is carried out by compressing winding wires by moving a shaft with a surface of the magnetic inner part against an inner side of the motor coil, wherein the shaping of the motor coil is carried out during the winding process by eccentrically rolling off of the surface of the magnetic inner part on the inner side of the motor coil and an abutment against an outer side of the motor coil, and
a third step, in which the compressed motor coil is baked by applying heat.

2. The method as claimed in claim 1, wherein the abutment or the magnetic inner part is excited during the shaping process by mechanical vibration.

3. The method as claimed in claim 1, wherein the motor coil is wound from a self-bonding wire, which during the winding of the windings wires, the motor coil is pre-deformed into a square shape.

4. The method as claimed in claim 1, wherein the end faces are part of end plates which are located on the magnetic inner part.

5. The method as claimed in claim 4, wherein an outer diameter of the end plate is slightly larger than an outer diameter of the magnetic inner part.

6. The method as claimed in claim 5, wherein the outer diameter of the end plate is larger than the outer diameter of the magnetic inner part by twice an air gap between the motor coil and the inner part.

7. The method as claimed in claim 1, wherein the magnetic inner part is connected to a shaft in a rotationally fixed manner.

8. The method as claimed in claim 1, wherein the second step comprises eccentrically rolling off of the magnetic inner part on the inner side of the motor coil against an abutment.

9. A method for producing rotating electrical machines having a motor coil produced in a cantilevered manner for motors or generators, wherein the motor coil already surrounds a magnetic inner part during the manufacturing process, and this is also used as an aid for coil shaping during the production of the coil, comprising:
a first step, in which the motor coil is wound in a stepwide process between two end faces over the magnetic inner part and completely surrounds the magnetic inner part,
a second step, in which shaping of the motor coil is carried out by compressing winding wires by moving the shaft with a surface of the magnetic inner part against an inner side of the motor coil, and a third step, in which the compressed motor coil is baked by applying heat,
wherein the first, the second and the third method steps are combined into a simple method step, wherein the shaping and the baking of the motor coil are carried out during the winding process by eccentrically rolling off of the surface of the magnetic inner part on an inner side of the winding wires and an abutment against an outer side of the winding wires, and said baking of the compressed winding wires are conducted on each layer of the winding wires.

10. A method for producing rotating electrical machines having a motor coil produced in a cantilevered manner for motors and generators, wherein the motor coil already surrounds a magnetic inner part during the manufacturing process, and this is also used as an aid for coil shaping during the production of the coil, comprising:
a first step, in which the motor coil is wound in a stepwide process between two end faces over the magnetic inner part and completely surrounds the magnetic inner part,
a second step, in which shaping of the motor coil is carried out by compressing winding wires by moving the shaft with a surface of the magnetic inner part against an inner side of the motor coil, and
a third step, in which the compressed motor coil is baked by applying heat,
wherein the second step comprises eccentrically rolling off of the magnetic inner part on the inner side of the motor coil and an abutment against an outer side of the motor coil.

11. The method as claimed in claim 10, wherein the first, the second and the third method steps are combined into a single method step, wherein the shaping and the baking of the motor coil are carried out during the winding process by eccentrically rolling off of the surface of the magnetic inner part on an inner side of the winding wires of the motor coil and the abutment of the outer side of the winding wires of the motor coil, and said baking of the compressed winding wires are conducted on each layer of the winding wires.

12. The method as claimed in claim 10, wherein the abutment or the magnetic inner part is excited during the shaping process by mechanical vibration.

13. The method as claimed in claim 10, wherein the motor coil is wound from a self-bonding wire, which during the winding of the windings wires of the motor coil is pre-deformed into a square shape.

14. The method as claimed in claim 10, wherein the end faces are part of end plates which are located on the magnetic inner part.

15. The method as claimed in claim 14, wherein an outer diameter of the end plate is slightly larger than an outer diameter of the magnetic inner part.

16. The method as claimed in claim 15, wherein the outer diameter of the end plate is larger than the outer diameter of the magnetic inner part by twice an air gap between the motor coil and the magnetic inner part.

17. The method as claimed in claim 10, wherein the magnetic inner part is connected to a shaft in a rotationally fixed manner.

\* \* \* \* \*